United States Patent Office 3,245,319
Patented Apr. 12, 1966

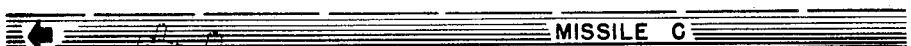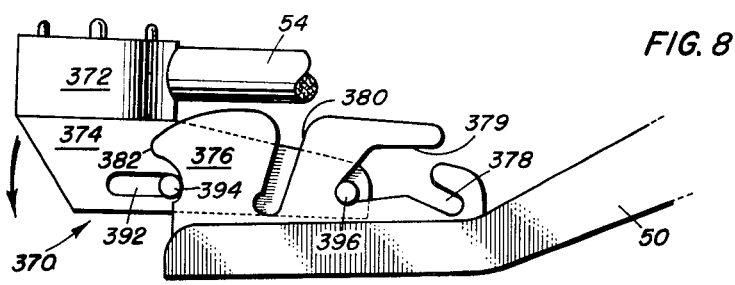

3,245,319
UMBILICAL RETRACT MECHANISM
Robert L. Kossan, Adelphi, Md., Robert E. Carlberg, McLean, Va., Louis H. Weber, Rockville, and Richard H. Allen, Beltsville, Md., and Palmer G. Wermager, Minneapolis, John L. Scheurich, Excelsior, and Bertram J. Matson, Minneapolis, Minn., assignors, by direct and mesne assignments, to the United States of America as represented by the Secretary of the Navy
Original application Mar. 26, 1963, Ser. No. 268,496. Divided and this application May 25, 1964, Ser. No. 385,531
2 Claims. (Cl. 89—1.7)

This application is a divisional application of Serial Number 268,496, filed March 26, 1963.

The present invention relates generally to missile launchers and more particularly to a device for disconnecting an umbilical connector from a missile as the missile is launched.

It is generally necessary in missile launching systems to supply electrical power to the missile until, and sometimes even after, the rocket motor is fired. It is therefore necessary to utilize an umbilical to provide a flexible electrical connection until the missile has lifted off the launcher.

One type of umbilical connection which has been utilized is an aft end installation, whereby the launching of the missile readily pulls the umbilical apart. This type of connection is not always satisfactory, especially where axial space is at a premium, or where missile loading is accomplished in a forward axial direction. The present invention provides an umbilical disconnector which may be placed anywhere along the length of the missile.

It is the primary object of this invention to provide an umbilical connector which separates upon movement of the missile relative to the launcher incident to missile launch.

It is a further object of this invention to provide an umbilical connector which transmits a minimum of force transverse to the missile upon separation incident to missile launch.

It is another object of this invention to provide an umbilical connector which is positively held out of the path of a launched missile after separation of the connector.

Other objects and many of the attendant advantages of this invention will be readily appreciated as the same becomes better understood by reference to the following detailed description when considered in connection with the accompanying drawings wherein:

FIG. 5 is a vertical elevation showing the plug and umbilical disconnector in load position;

FIG. 6 is a vertical elevation similar to FIG. 5 in which the plug is in engagement with the missile;

FIG. 7 is a vertical elevation similar to FIGS. 5 and 6 and showing the operation of the umbilical disconnector in the initial stage of disconnect; and FIG. 8 is a vertical elevation, similar to FIGS. 5 through 7, and showing the final stage of disconnect.

Figure 1:
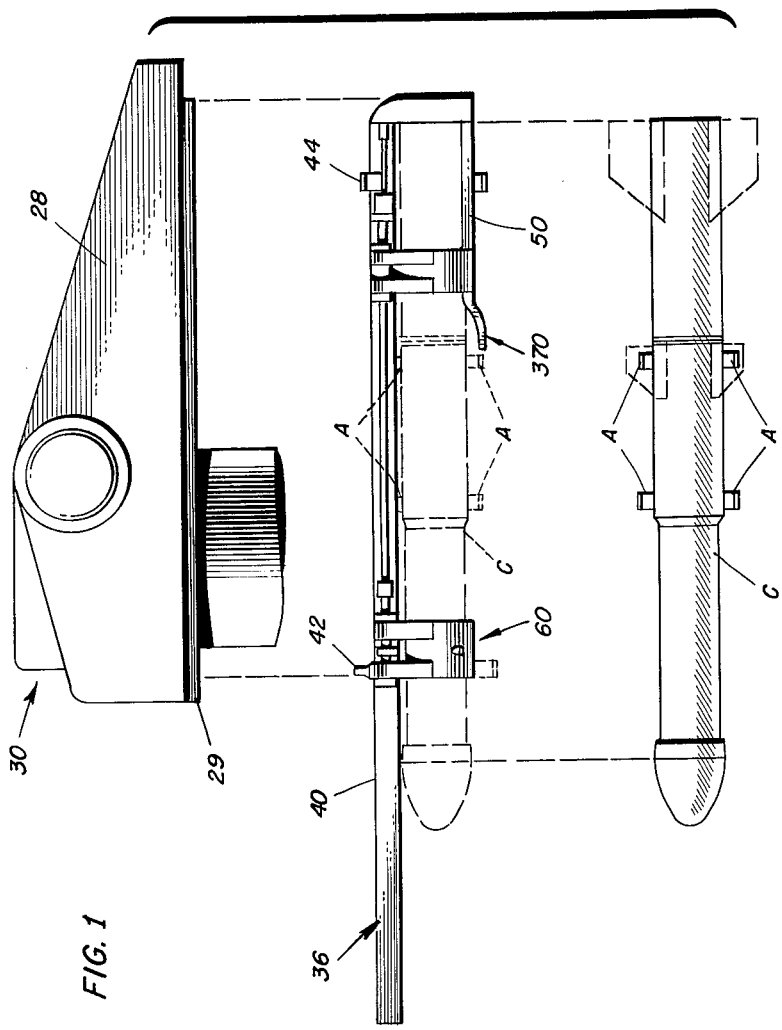
FIG. 1 is a composite view of a launcher arm illustrating the manner in which the missile is secured to the adapter rail and the adapter rail supported by the launcher arm.
Figure 2:
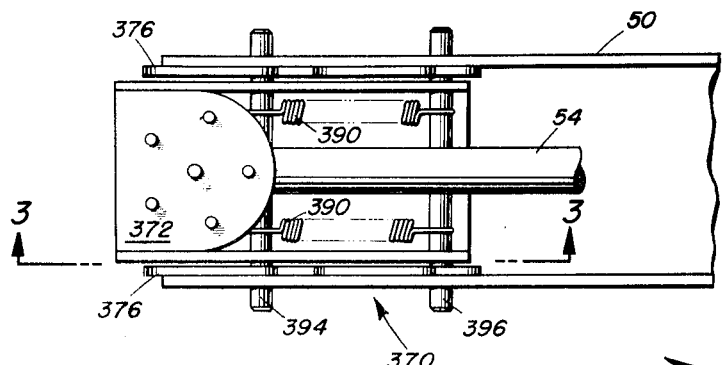
FIG. 2 is a top plan view of the umbilical disconnector.
Figure 3:
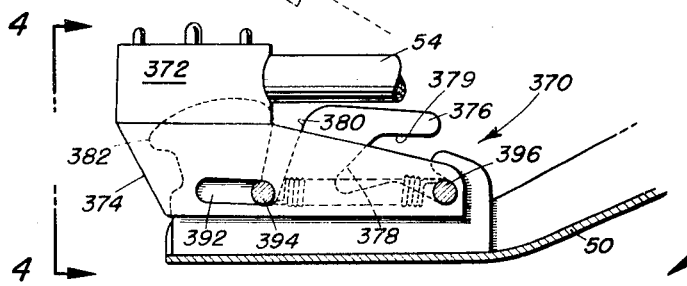
FIG. 3 is a composite section taken on line 3—3 of FIG. 2 and showing the relationship of the umbilical disconnector to the missile.
Figure 4:
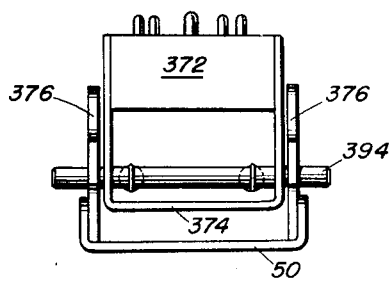
FIG. 4 is a vertical elevation taken on line 4—4 of FIG. 3 showing the umbilical disconnector.

Referring now to FIG. 1, the missile launcher 30 is comprised of a launcher arm 28 and a rail 36. Upper shoes 42 and 44, mounted on the top surface of beam 40, are utilized to support rail 36 and missile C on the launcher arm track 29. Lugs A on missile C support the missile on track 29 after the shoes have been released and while the missile is traveling down the track during launch. A cantilever beam 50 is bolted to the aft end of the beam 40, and has a U-shaped groove on its underside for containing the umbilical cord 54.

The missile C is retained on the adapter rail by means of forward and aft snubbers 60 and 62 respectively, which are mounted on the beam 40. The snubbers 60 and 62 are mounted on off-center bearings so that as they close they do not contact the missile until uniform pressure is applied to the whole area of contact. The aft snubber 62 has two arms, one of which is shown at 66, which engage the cantilever beam 50 when closed and form therewith a complete lateral enclosure for missile C. The forward snubber 60 similarly forms a complete lateral enclosure for missile C.

An umbilical cable disconnector 370, as shown in FIGS. 1 through 4, is attached to the free end of cantilever beam 50. The umbilical disconnector is necessary to break the physical electrical connection between the missile C and the rail 36. As the missile C is launched, the missile C moves relative to the rail 36 and some means must be provided to remove the electrical connection that was provided between the rail and missile. An electrical plug 372, attached to cable 54, engages a complimentary electrical socket or receptacle 373 contained within and integral with the missile C. To provide a means for disconnecting or interrupting the electrical connection, two plates 376 are vertically mounted on the outer edges of the cantilever beam 50. The plates 376 have a V-shaped groove 378 with an overhanging lip 379 near the rear portion thereof and a slot 380 in the central portion thereof. The plates are also provided with an overhanging lip 382 on the front portion thereof. The bottom of the plug 372 has attached thereto a substantially U-shaped member 374. A cross member 396 is rigidly attached to the U-shaped member 374. A second cross member 394 is slideably retained within a pair of slots 392 in member 374. A pair of tension springs 390 are fastened between the two cross members 394 and 396 and bias the second cross member 394 toward the back of slots 392 or toward the rigid cross member 396.

The operation of the umbilical cable disconnector is illustrated in FIGS. 5 through 8. The plug 372 is manually positioned as shown in FIG. 5 before a missile type C is loaded onto the rail 36. The horizontal position keeps the plug 372 out of the way of the missile body. After the missile type C has been loaded onto the rail 36, the plug 372 is amnually inserted in socket or receptacle 373 and the rigid cross member 396 is located within the V-shaped groove 378 and below the overhanging lip 379. As the missile C moves relative to the rail 36 upon launching, the rigid cross member 396 contacts the forward edge of V-shaped groove 378, stopping forward motion of plug 372. Further motion of the missile C disconnects the plug 372 from the socket 373 in the missile C. Upon still further motion of missile C, surface 501 of the missile cams plug 372 forward and downward, so that overhanging lip 382 cams the movable cross member 394 forward against the bias of the springs 390 until the member 394 clears the lip 382. The springs 390 then pull the member 394 under the overhanging lip 382 and lock the plug 372 in a horizontal position removed from the path of the missile. Because parts of the connector are destroyed by the missile's rocket motor blast, an umbilical cable 54 is expended with each missile launching and must be replaced.

One possible modification of plug 372 and receptacle 373 would place the male pin connectors in surface 502 of missile C, rather than on plug 372. Such a configuration would more nearly align the direction of relative motion of plug 372 and receptacle 373 during separation with the direction of motion of missile C during launch, and might thereby reduce the magnitude of transverse forces transmitted to missile C during disconnection of the umbilical.

Obviously many modifications and variations of the present invention are possible in the light of the above teachings. It is therefore to be understood that within the scope of the appended claims the invention may be practiced otherwise than as specifically described.

What is claimed is:

1. An umbilical disconnector for breaking the electrical connection between a missile mounted receptacle and a launching rail mounted plug engageable with the receptacle comprising;
    a substantially U-shaped member attached to the plug and having a pair of slots therein,
    a first cross member rigidly attached to and spanning said U-shaped member,
    a second cross member movably retained within said slots and spanning said U-shaped member,
    and a pair of plates mounted on the rail and positioned in a manner to accept said U-shaped member therebetween,
    each of said plates having an overhanging lip on the forward portion, and a groove of greater length than the width of said first cross member on the rear portion, whereby said first member will contact the edge of said groove upon initial movement of the missile and said U-shaped member will swing away from the missile disconnecting the plug from the receptacle.

2. An umbilical disconnector for breaking the electrical connection between a missile-mounted receptacle and a launching rail-mounted plug engageable with the receptacle, comprising:
    first plate means fixed to the plug and parallel to the longitudinal axis of the launching rail;
    a first cross member transverse to said first plate means and rigidly fixed thereto;
    a second cross member transverse to said first plate means and mounted in said first plate means for reciprocating movement relative thereto;
    said second cross member being resiliently biased toward said first cross member;
    second plate means parallel to said first plate means and rigidly mounted on the launching rail, said second plate means being slotted to receive said first and second cross members;
    said slots in said second plate means being so configured as to extract the plug from the receptacle in response to movement of the missile incident to launch;
    the plug being disposed on the bail in a manner to be displaced from the path of a missile being launched by engagement with such missile following separation of the umbilical connector incident to missile launch; and
    overhanging lip means on said second plate means cooperating with said second cross member to positively hold the plug in its displaced position.

References Cited by the Examiner
UNITED STATES PATENTS

| | | | |
|---|---|---|---|
| 2,594,748 | 4/1952 | Earl | 339—18 |
| 2,951,421 | 9/1960 | Katzen | 89—1.7 |
| 3,119,645 | 1/1964 | Abbott et al. | 339—45 |

BENJAMIN A. BORCHELT, *Primary Examiner.*

SAMUEL W. ENGLE, *Assistant Examiner.*